US006316073B1

(12) United States Patent
Hiscock et al.

(10) Patent No.: US 6,316,073 B1
(45) Date of Patent: Nov. 13, 2001

(54) MULTI-PURPOSE RE-USABLE ADHESIVE PAD

(76) Inventors: Anthony S. Hiscock; Harold F. Hiscock, both of P.O. Box 20039, Kelowna, British Columbia (CA), V1Y 9H2

(*) Notice: Subject to any disclaimer, the term of this patent is extended or adjusted under 35 U.S.C. 154(b) by 0 days.

(21) Appl. No.: 09/275,937

(22) Filed: Mar. 25, 1999

Related U.S. Application Data

(60) Provisional application No. 60/079,602, filed on Mar. 27, 1998.

(51) Int. Cl.[7] .......... B32B 3/02

(52) U.S. Cl. .......... 428/68; 40/710; 40/712; 40/765; 428/66.4

(58) Field of Search .......... 428/68, 66.4; 40/710, 40/712, 765

(56) References Cited

U.S. PATENT DOCUMENTS

| | | | | |
|---|---|---|---|---|
| 2,958,495 | | 11/1960 | Foster | 248/176 |
| 4,356,989 | | 11/1982 | Ireland | 248/206 |
| 4,755,040 | * | 7/1988 | Haslbeck | 2/428 |
| 4,813,640 | | 3/1989 | Perentin | 248/205.8 |
| 5,047,102 | | 9/1991 | Emery | 156/71 |
| 5,104,077 | | 4/1992 | Liu | 248/205.8 |
| 5,133,524 | | 7/1992 | Liu | 248/205.8 |
| 5,318,262 | | 6/1994 | Adams | 248/205.8 |
| 5,423,716 | | 6/1995 | Strasbaugh | 451/388 |
| 5,613,659 | | 3/1997 | Hong | 248/205.8 |
| 5,639,553 | | 6/1997 | Nagai et al. | 428/409 |

FOREIGN PATENT DOCUMENTS 2723616 12/1978 (DE) .

* cited by examiner

*Primary Examiner*—Nasser Ahmad
(74) *Attorney, Agent, or Firm*—Antony C. Edwards

(57) ABSTRACT

The present invention is a thin, soft resilient pad or gasket having a durometer rating of less than or equal to 30, scale shore A, releasably mountable to a rough (or at least non-smooth) or smooth surface by reason of its resiliency and inherent surface tackiness, and may be made of hydrated cross-linked silicone polymer, or of aromatic or aliphatic base urethane or polyurethane, advantageously with bound migrating plasticizers to reduce oily surface residue on the gasket.

8 Claims, 1 Drawing Sheet

MULTI-PURPOSE RE-USABLE ADHESIVE PAD

CROSS REFERENCE TO RELATED APPLICATION

This application claims priority from U.S. Provisional Patent Application No. 60/079,602 filed Mar. 27, 1998, now abandoned ,titled multi-Purpose Re-Useable Adhesive Pad.

FIELD OF THE INVENTION

This invention relates to an improvement in devices used for the temporary mounting or holding of objects on or to surfaces by way of adhesives, tape or similar bonding methods.

BACKGROUND OF THE INVENTION

Tape or adhesives are often used to fasten objects to other surfaces. A draw back to using tape in most applications is that once applied it can not be removed then re-used; and if it is forcibly removed, damage to the paper or the surface often results. The problem with adhesives is that they may be to permanent for a given application and are most often not re-useable. Non-resilient materials such as "Funtack®" by Lepage (blue putty like substance used for holding paper on walls), do not have sufficient adhesion for many applications.

Applicant is aware of Post-it™ notes manufactured by 3M of Minneapolis, Minn., which are well known in the prior art for allowing releasable mounting of sheets of paper to solid objects. The Post-it™ notes are used for making annotations which may be temporarily placed where it is convenient and removed without leaving residue from the chemical adhesives found on the back of such notes. A further advantage of Post-it™ notes is that removal of the note does not ordinarily damage the surface to which the note was mounted.

Applicant has devised a reusable pad which may be used in a similar fashion to Post-it™ notes with the advantage that sheets of unglued (i.e. ordinary) paper may be adhered to the surface of solid objects and removed therefrom without leaving a residue and without damaging the surface. Further advantageously, the pad of the present invention allows for the releasable adhering of much larger sheets of ordinary paper or heavier sheets, for example, laminated paper or cardboard in larger poster sizes. These advantages, which are objects of the present invention, may be obtained in part due to resilient characteristics which distinguish the pad of the present invention clearly from conventional adhesives which would include the releasable adhesive used on the back of Post-it™ notes.

A further application of the pad of the present invention is the prevention of slippage of objects placed onto otherwise smooth surfaces such as that of a table top or desk top. One example is the common frustrating situation of a telephone placed on a desk top where the user, when on the telephone, has to reach to obtain something while at the same time holding the telephone handset to the user's ear. The result is the telephone slides off the desk and falls to the floor. Placing the pads of the present invention under the feet of the telephone inhibit the sliding of the telephone over the desk due to the natural tackiness, as better described hereinbelow, of the adhesive pad. This is to be distinguished from conventional rubberized anti-slip devices which do not have a natural tackiness designed as part of their inherent properties.

An example of one use of the adhesive pad of the present invention is to place at least one pad on a side or front surface of a computer monitor. The pad is left in place and when it is desired to place sheets of paper, for example small notes or the like, onto the monitor temporarily, the sheet of paper is merely pressed against the pad. When the note is no longer required, it is merely peeled from the pad leaving the pad behind adhered to the monitor surface. Advantageously then, because the pad is left in place on the monitor or computer surface, or for that matter on any other convenient surface where a person may wish to place notes to him or herself, such as a refrigerator in the home, on a door, on a car interior surface, or the like, because the pad is often viewed by the user when a piece of paper is not adhered thereto, the interior of the pad may support therein an advertising logo or like commercialized message.

Another use of the adhesive pad, and which is an object of the present invention to provide, is to support not only the logos or the like held encapsulated within the interior of the pad and viewable through the pad, (i.e. in one embodiment the pad is translucent or closely approximates transparency), but also to replace the common annoying use by children of stickers bearing the likenesses of their favourite pop stars or other comic books heroes or the like. Such stickers are often brought home by children and adhered to the children's bedroom walls, bedroom doors, bedroom furniture and the like and have proven to be very difficult to remove especially without damaging the painted or finished surfaces. It is an object of the present invention to provide a replacement for these stickers whereby the likenesses which appeal to the children are embedded into the pads and the pads themselves used by the children instead of adhesive stickers.

SUMMARY OF THE INVENTION

The surface tackiness and deliberately soft resiliency of the adhesive pad of the present invention allows, as described above, the adherence of the pad to somewhat porous and rough surfaces such as painted walls and painted wooden doors. When the adhesive pad of the present invention is used to adhere to already smooth surfaces such as glass, Lexan™, Plexiglas™, or the like, the result is a strong bond which remains releasably mounted to support a variety of items. One example would be where a Lexan™ panel is used as a point of purchase display and the adhesive pads of the present invention are mounted to the Lexan™ panel. The adhesive pads will then support a display mounting device such as small shelf or hook so long as the shelf or hook or the like has a smooth rigid backing plate which may also be made of glass or Lexan™ or Plexiglas™ or the like. The backing plate of the display mounting device is then pressed against the adhesive pad of the present invention so as to sandwiched the adhesive pad between the backing plate and the Lexan™ or glass panel. Thus as may be readily understood, a display window may have a small glass or plastic shelf releasably mounted to the glass so as to display objects placed onto the shelf.

Thus, as will be recognized by one skilled in the art, the adhesive pads of the present invention allow for releasable, break-away mounting of many types of objects to smooth or somewhat rough and porous surfaces in situations where ordinarily secure mounting by means of conventional adhesives or mechanical fasteners would be required.

The pad of the present invention may be a gasket of any shape. The pad or gasket material may be made from a silicone, urethane, polyurethane or any other material which when produced allows for a selective surface tack range by way of durometer manipulation. The effective durometer range for the gasket material would be anything less than or equal to30 shore A.

A further improvement of the invention would be to select a material, which, by way of chemical process, would have the plasticizers bound to inhibit them from migrating out of the material. It would also contain ultraviolet light stabilizers to keep the material from degrading when exposed to sunlight.

The material could be used to encapsulate advertising printed on film or some other inserted medium.

In summary, the present invention is a thin, soft resilient pad or gasket having a durometer rating of less than or equal to 30, scale shore A, releasably mountable to a rough (or at least non-smooth) or smooth surface by reason of its resiliency and inherent surface tackiness. The resilient gasket may be made of hydrated cross-linked silicone polymer, or of aromatic or aliphatic base urethane or polyurethane, advantageously with bound migrating plasticizers to reduce oily surface residue on the gasket.

DETAILED DESCRIPTION OF THE PREFERRED EMBODIMENT

Figure 1:
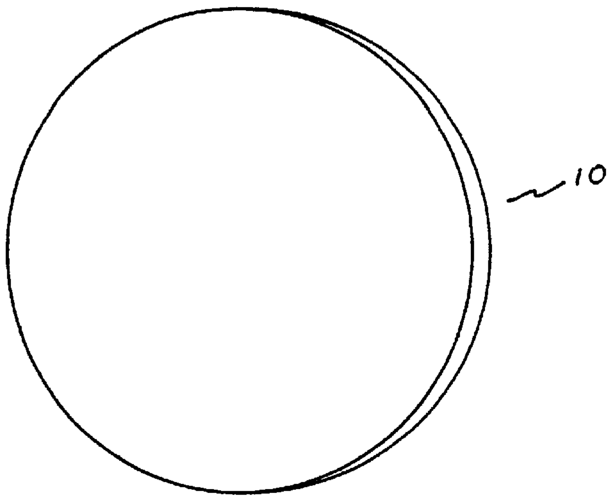
FIG. 1 illustrates, in front perspective view, one embodiment of the Re-Useable Adhesive Pad.
Figure 2:
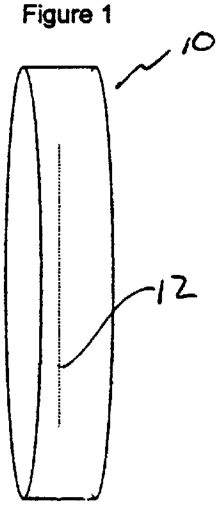
FIG. 2 illustrates a side perspective view the Re-Useable Adhesive Pad of FIG. 1, with a logo bearing wafer embedded.
Figure 3:
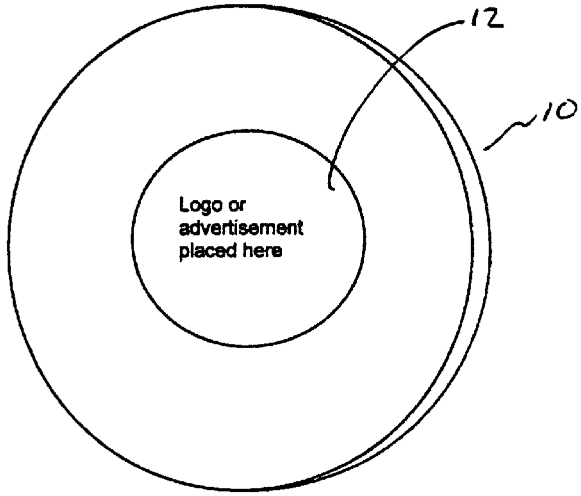
FIG. 3 illustrates, in front perspective view, the pad of FIG. 2.

The invention is a way to mount posters or similar items on vertical surfaces by placing a gasket 10 of the material between the wall and the poster; or to keep items from slipping on desks and similar surfaces by placing a gasket between the desk and the item. Gasket 10 may be disc-like or other shapes in planform, advantageously approximately ⅛ th of an inch thick although this is not intended to be limiting.

The invention relies on the natural “tacky” property a urethane, polyurethane, silicone or similar type of material may have when prepared below the durometer measurement of30 shore A. When a gasket is molded out of such material its surface will have a sticky feel to it much like that to be found on a piece of cellophane tape. This enables the gasket to be placed between a poster or other object and the surface it is to be mounted on, so that it may facilitate temporary mounting of such object. The resilient nature of the material allows the pad to deform (stretch) to release from the surface and then return to its molded shape. This means the gasket may be removed without damage to the poster or the surface it was mounted on. Further, because the stickiness of the material is a consequence of the softness, the gasket can be re-used over and over, and washed if necessary.

Further properties embodied in the material would be:

a) The resilient material would leave minimal residue because the material plasticizers would be chemically bound.

b) The resilient material could withstand exposure to sunlight because of added ultraviolet stabilizers (inhibitors).

c) The resilient material could be produced in any color.

d) The resilient material could be produced to encapsulate a sheet or disk which would facilitate advertising.

e) The operating temperature range of the gasket material is about −40 C. to +150 C.

The material used for the gasket may be a two part polyurethane elastomer based on modified MDI (diphenylmethane diisocyanate) containing a UV inhibitor.

By varying the mix ratio (by weight) of the two components making up the elastomer by methods known in the art, different durometers of the end material have been realized. This flexibility provides for the precise tailoring of the material to a specified durometer range. For example, the following mix ratios by weight yield the indicated durometers:

| Component A | Component B | Durometer |
|---|---|---|
| 43 | 100 | 40 shore 00 |
| 45 | 100 | 50 shore 00 |
| 48 | 100 | 60 shore 00 |

In the preferred embodiment, component A is Diphenylmethane-diisocyanate and component B is Butyl Benzyl Phthalate. The polyurethane elastomer at its ideal stoichiometric ratio yields the optimum durometer 40 to 45 shore 00. As a result, applicant is not limited by the mix ratio when producing specified durometers for specific applications. However the practical limits of the mix ratio are 40:100 (A:B) for a low durometer and 56:100 (A:B) for a high durometer. Beyond these mix ratios the material becomes either too soft for any practical use or too hard to function as specified. The UV (ultraviolet) inhibitor maintains the chemical integrity of the product when exposed to sunlight. This ensures the product will perform as required when used in window applications. By varying the durometer values the applicants are able to custom design the gasket for specific applications. The gasket may be translucent or somewhat transparent and may be color free so that wafer-mounted advertising logos 12, color pigment or the like may be embedded into the gasket. The wafers may be plastic or paper, or may be formed merely of a pigment or tattoo-like layer embedded in the gasket.

The advantages of the applicants’ pad design are as follows:

a) Used in place of tape, temporarily mounted items can be removed without damage.

b) When exposed to sunlight, the adhesive properties are not compromised by way of material degradation.

c) When removed from a surface, minimal residue remains.

d) Encapsulation of text or images for advertising or entertainment purposes.

e) Can be used to keep items from slipping, without being as permanent as an adhesive.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A reusable adhesive pad for mounting objects to a surface, said pad comprising a resilient gasket having a durometer rating of less than or equal to 30, shore A, said resilient gasket having a tackiness and a level of migrating plasticizers so as to minimize oily residue on surfaces of said resilient gasket, wherein said pad is translucent and text, or a graphic bearing wafer, is embedded in said pad.

2. The pad of claim 1 wherein said resilient gasket is made of an aromatic or aliphatic base urethane or polyurethane elastomer.

3. The pad of claim 1 wherein said resilient gasket has a durometer rating of less than or equal to 20, shore A.

4. The pad of claim 1 wherein said migrating plasticizers are bound.

5. The pad of claim 2 wherein said migrating plasticizers are bound.

6. The pad of claim 1 wherein said resilient gasket is made by mixing Diphenylmethane-diisocyanate with Butyl Benzyl Phthalate in a mix ratio by weight of greater than or equal to 40:100 Diphenylmethane-diisocyanate: Butyl Benzyl Phthalate and less than or equal to 56:100 Diphenylmethane-diisocyanate: Butyl Benzyl Phthalate.

7. The pad of claim 1 wherein said resilient gasket is made of polyurethane elastomer having a durometer rating of greater than or equal to 40 and less than or equal to 45 shore 00.

8. The pad of claim 7 wherein said resilient gasket is made of polyurethane elastomer having a durometer rating of greater than or equal to 40 and less than or equal to 45 shore 00.

* * * * *